United States Patent
Pavel et al.

(10) Patent No.: US 7,725,264 B2
(45) Date of Patent: May 25, 2010

(54) IN-FIELD CONTROL MODULE FOR MANAGING WIRELESS SEISMIC DATA ACQUISITION SYSTEMS AND RELATED METHODS

(75) Inventors: Dennis R. Pavel, Highland Village, TX (US); Scott T. Hoenmans, Arvada, CO (US); Richard Eperjesi, Stafford, TX (US); Andra Streho, Eccles, WV (US); Gerardo Garcia, Highlands Ranch, CO (US); Richard Pedersen, Sugar Land, TX (US); Dmitry Grinblat, Houston, TX (US)

(73) Assignee: Ion Geophysical Corporation, Houston, TX (US)

( * ) Notice: Subject to any disclaimer, the term of this patent is extended or adjusted under 35 U.S.C. 154(b) by 0 days.

(21) Appl. No.: 11/864,195

(22) Filed: Sep. 28, 2007

(65) Prior Publication Data
US 2008/0114548 A1 May 15, 2008

Related U.S. Application Data

(60) Provisional application No. 60/848,199, filed on Sep. 29, 2006.

(51) Int. Cl.
*G01V 1/20* (2006.01)
*G01V 1/00* (2006.01)
*G01V 1/16* (2006.01)
*G01V 1/28* (2006.01)
*G01V 1/30* (2006.01)
*G06F 19/00* (2006.01)
*G06F 17/40* (2006.01)

(52) U.S. Cl. ............ 702/14; 175/50; 340/853.2; 702/1; 702/2; 702/6; 702/11; 702/187; 702/189

(58) Field of Classification Search ............ 181/101, 181/102, 106, 108, 111, 112, 122; 367/9, 367/14, 56, 58, 76, 77, 7, 8, 11, 13, 37, 38, 367/69, 72; 702/11, 13, 14, 1, 2, 6, 7, 12, 702/16, 127, 187, 188, 189; 73/152.01, 152.02, 73/152.03, 152.14, 570, 584, 587, 594; 340/853.1, 340/853.2; 175/1, 40, 41, 50; 324/323; 381/58; 700/1, 9; 707/100, 104.1
See application file for complete search history.

(56) References Cited

U.S. PATENT DOCUMENTS 3,541,513 A * 11/1970 Patterson ............... 340/10.41

(Continued)

FOREIGN PATENT DOCUMENTS

EP 0250280 A1 12/1987

(Continued)

OTHER PUBLICATIONS

LRS Quarterly, vol. 1, Issue 3, May 12, 2003.

(Continued)

*Primary Examiner*—Edward R Cosimano
(74) *Attorney, Agent, or Firm*—Mossman, Kumar & Tyler, PC

(57) ABSTRACT

An exemplary system for managing the deployment of a seismic data acquisition system uses a module configured to execute a plurality of task in the field by receiving one or more seismic devices. The module may include a power source that provides electrical power to the seismic devices. The module may also include a processor programmed to retrieve data stored in the seismic devices, perform diagnostics, facilitate inventory and logistics control, configure seismic devices and update data or pre-programmed instructions in the seismic device.

25 Claims, 10 Drawing Sheets

U.S. PATENT DOCUMENTS

| | | | |
|---|---|---|---|
| 3,733,584 A | 5/1973 | Pelton et al. | |
| 3,806,864 A | 4/1974 | Broding et al. | |
| 3,886,494 A | 5/1975 | Kostelnicek et al. | |
| 4,086,504 A | 4/1978 | Ezell et al. | |
| 4,236,234 A | 11/1980 | McDavid et al. | |
| 4,296,485 A | 10/1981 | Clemens | |
| 4,297,700 A | 10/1981 | Nard et al. | |
| 4,366,561 A | 12/1982 | Klein | |
| 4,628,494 A | 12/1986 | Rialan et al. | |
| 4,639,901 A | 1/1987 | Warmack et al. | |
| 4,644,506 A | 2/1987 | Cretin et al. | |
| 4,725,992 A | 2/1988 | McNatt et al. | |
| 4,807,200 A | 2/1989 | Montes et al. | |
| 4,814,711 A | 3/1989 | Olsen et al. | |
| 4,815,944 A | 3/1989 | Maruyama et al. | |
| 4,885,724 A | 12/1989 | Read et al. | |
| 4,905,205 A | 2/1990 | Rialan | |
| 4,908,803 A | 3/1990 | Rialan | |
| 4,967,400 A | 10/1990 | Woods | |
| 4,979,152 A | 12/1990 | Rialan et al. | |
| 5,189,642 A | 2/1993 | Donoho et al. | |
| 5,206,835 A | 4/1993 | Beauducel | |
| 5,276,655 A | 1/1994 | Rialan et al. | |
| 5,351,244 A | 9/1994 | Rialan et al. | |
| 5,363,094 A | 11/1994 | Staron et al. | |
| 5,396,246 A | 3/1995 | Coquerel | |
| 5,467,290 A * | 11/1995 | Darland et al. | 342/463 |
| 5,481,502 A | 1/1996 | Cretin et al. | |
| 5,550,787 A | 8/1996 | Rialan et al. | |
| 5,563,847 A | 10/1996 | Grouffal et al. | |
| 5,617,371 A | 4/1997 | Williams | |
| 5,623,455 A | 4/1997 | Norris | |
| 5,627,798 A | 5/1997 | Siems et al. | |
| 5,681,008 A | 10/1997 | Kinstler | |
| 5,706,250 A | 1/1998 | Rialan et al. | |
| 5,724,241 A * | 3/1998 | Wood et al. | 702/14 |
| 5,745,074 A | 4/1998 | Laude | |
| 5,822,273 A | 10/1998 | Bary et al. | |
| 5,829,520 A | 11/1998 | Johnson | |
| 5,920,828 A * | 7/1999 | Norris et al. | 702/14 |
| 5,959,529 A | 9/1999 | Kail, IV | |
| 5,978,313 A | 11/1999 | Longaker | |
| 6,002,640 A | 12/1999 | Harmon | |
| 6,002,641 A | 12/1999 | Chien | |
| 6,023,444 A | 2/2000 | Naville et al. | |
| 6,061,299 A | 5/2000 | Grouffal et al. | |
| 6,070,129 A | 5/2000 | Grouffal et al. | |
| 6,078,283 A | 6/2000 | Bednar | |
| 6,208,247 B1 | 3/2001 | Agre et al. | |
| 6,208,626 B1 | 3/2001 | Brewer | |
| 6,219,620 B1 | 4/2001 | Park et al. | |
| 6,226,601 B1 | 5/2001 | Longaker | |
| 6,255,962 B1 | 7/2001 | Tanenhaus et al. | |
| 6,255,969 B1 | 7/2001 | Crayford | |
| 6,322,109 B1 | 11/2001 | Campbell et al. | |
| 6,353,577 B1 | 3/2002 | Orban et al. | |
| 6,430,106 B1 | 8/2002 | Staron | |
| 6,459,654 B1 | 10/2002 | Bary et al. | |
| 6,469,639 B2 | 10/2002 | Tanenhaus et al. | |
| 6,553,316 B2 | 4/2003 | Bary et al. | |
| 6,560,565 B2 | 5/2003 | Roy et al. | |
| 6,898,529 B2 | 5/2005 | Gao et al. | |
| 6,944,096 B2 | 9/2005 | Lemenager et al. | |
| 6,977,867 B2 | 12/2005 | Chamberlain | |
| 7,034,711 B2 | 4/2006 | Sakatani et al. | |
| 7,050,355 B2 | 5/2006 | Robertsson et al. | |
| 7,286,442 B2 * | 10/2007 | Ray et al. | 367/15 |
| 7,292,943 B2 * | 11/2007 | Elder et al. | 702/14 |
| 7,310,287 B2 * | 12/2007 | Ray et al. | 367/188 |
| 2001/0030907 A1 | 10/2001 | Bachrach | |
| 2004/0156267 A1 | 8/2004 | O'Brien et al. | |
| 2004/0252585 A1 | 12/2004 | Smith et al. | |
| 2004/0257913 A1 | 12/2004 | Ray et al. | |
| 2005/0052951 A1 * | 3/2005 | Ray et al. | 367/188 |
| 2005/0177310 A1 | 8/2005 | Duncan et al. | |
| 2005/0276162 A1 | 12/2005 | Brinkmann et al. | |
| 2006/0086497 A1 | 4/2006 | Ohmer et al. | |
| 2006/0120216 A1 * | 6/2006 | Ray et al. | 367/15 |
| 2006/0145881 A1 | 7/2006 | Sakatani et al. | |
| 2007/0070808 A1 * | 3/2007 | Ray et al. | 367/15 |
| 2008/0106977 A1 * | 5/2008 | Ray et al. | 367/188 |
| 2008/0137485 A1 * | 6/2008 | Ray et al. | 367/188 |
| 2008/0181055 A1 * | 7/2008 | Ray et al. | 367/20 |
| 2008/0192569 A1 * | 8/2008 | Ray et al. | 367/15 |
| 2008/0279636 A1 * | 11/2008 | Ray et al. | 405/173 |
| 2009/0016157 A1 * | 1/2009 | Ray et al. | 367/20 |

FOREIGN PATENT DOCUMENTS

| | | | |
|---|---|---|---|
| EP | 0552769 A2 | | 7/1993 |
| WO | WO9812577 A1 | | 3/1998 |
| WO | WO9818022 A1 | | 4/1998 |
| WO | WO9960424 A1 | | 11/1999 |
| WO | WO 2006/041438 A1 * | | 4/2006 |

OTHER PUBLICATIONS

408UL Reference Training Guide, Firmware Network Description, Jan. 13, 2000, pp. 13-1 to 13-18.

SGR II, Seismic Group Recorder System: High technology with a track record., Global Universal Sciences, Inc., 1984, pp. 1-6.

SGR III, Seismic Group Recorder System, Global Universal Sciences, Inc., 1985, pp. 1-4.

LaCosta & Romberg—Scintrex, Inc. Quarterly, vol. 1, Issue 3, May 12, 2003, What's Happening at LRS?, pp. 1-4.

* cited by examiner

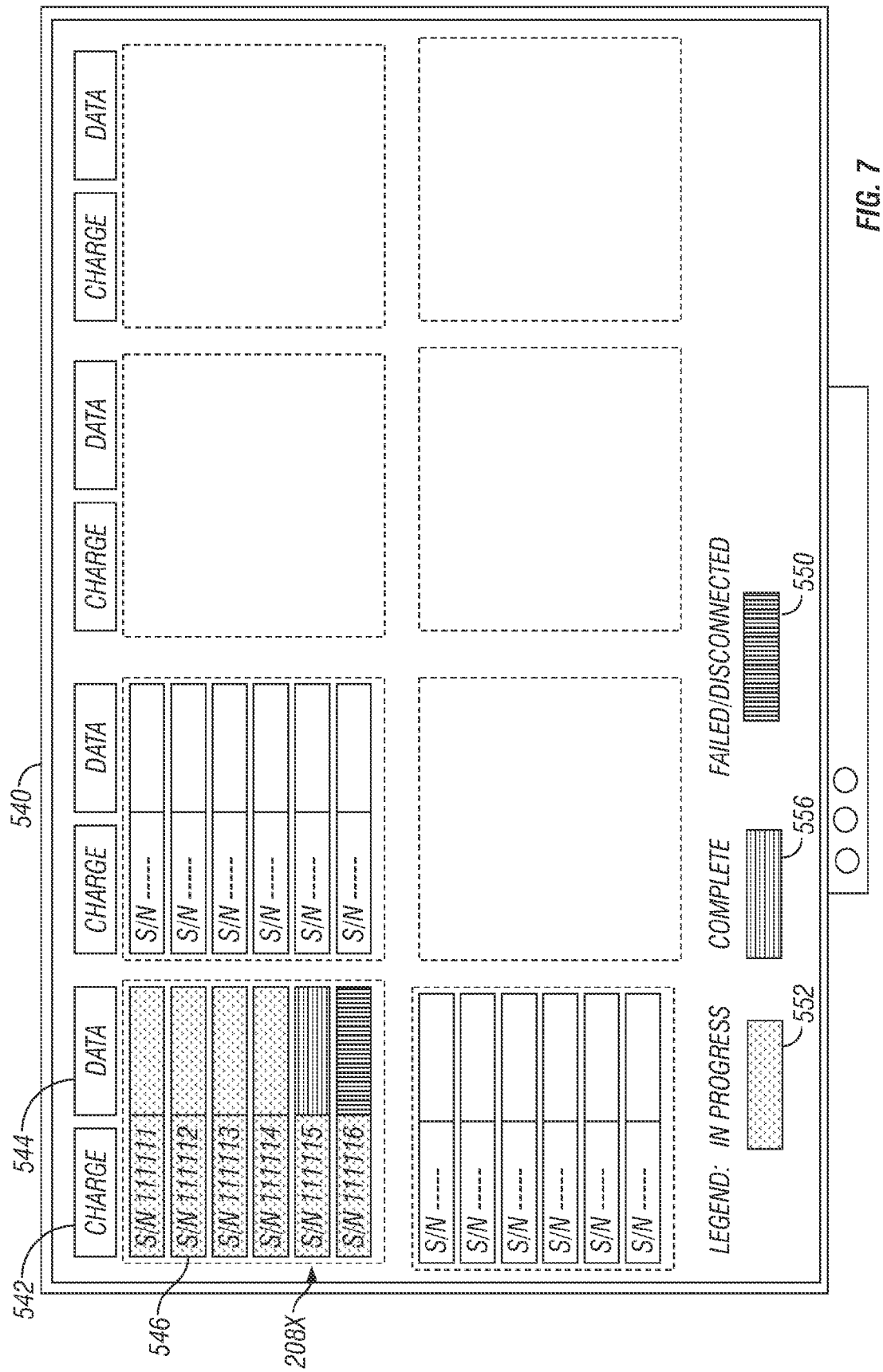

| | Column | Operator | Value1 | Value2 |
|---|---|---|---|---|
| 1 | Shot ID | = | 123456 | |
| 2 | Z | = | 654 | |
| 3 | Source Line | BETWEEN | 2 | 7 |
| 4 | | = | | |

FIG. 8

IN-FIELD CONTROL MODULE FOR MANAGING WIRELESS SEISMIC DATA ACQUISITION SYSTEMS AND RELATED METHODS

CROSS-REFERENCE TO RELATED APPLICATIONS

This application claims the benefit of expired U.S. Provisional application 60/848,199 filed on Sep. 29, 2006. This Application is related to U.S. patent application Ser. No. 10/664,566, file on Sep. 17, 2003 title "Single Station Wireless Seismic Data Acquisition Method and Apparatus," now abandoned, which is hereby incorporated by reference for all purposes.

BACKGROUND OF THE DISCLOSURE

Oil companies conduct seismic surveying to lower risk and to reduce costs of locating and developing new oil and gas reserves. Seismic surveying is, therefore, an up-front cost with intangible return value. Consequently, minimizing the cost of seismic surveying and obtaining quality results in minimum time are important aspects of the seismic surveying process.

Seismic surveys are conducted by deploying an array of seismic sensors over a terrain of interest. These arrays may cover over 50 square miles and may include 2000 to 5000 seismic sensors. An energy source such as buried dynamite may be discharged within the array to impart a shockwave into the earth. The resulting shock wave is an acoustic wave that propagates through the subsurface structures of the earth. A portion of the wave is reflected at underground discontinuities, such as oil and gas reservoirs. These reflections are then sensed at the surface by the sensor array and recorded as seismic data. Such sensing and recording are referred to herein as seismic data acquisition. This seismic data is then processed to generate a three dimensional map, or seismic image, of the subsurface structures. The map may be used to make decisions about drilling locations, reservoir size and pay zone depth.

Seismic data acquisition systems typically include a relatively large quantity of equipment. The management of this equipment may be cumbersome due to the variety of equipment involved, the relatively large area within which the equipment may be deployed and technical differences such as different maintenance requirements, handling requirements, etc. The present disclosure addresses the needs for effective management of assets related to seismic data acquisition systems as well as the information generated by such systems.

SUMMARY OF THE DISCLOSURE

In aspects, the present disclosure provides a system for managing seismic data acquisition activity. In one embodiment, the system includes one or more seismic devices; a module configured to receive the one or more seismic devices; a processor associated with the module, the processor being configured to communicate with the one or more seismic devices; and a database in communication with the processor, the database being configured to store data associated with the one or more seismic devices. One illustrative database may store: data received from the one or more seismic devices; data relating to a location of the one or more seismic devices, data relating to an operating characteristic of the one or more seismic devices, and/or data relating to an operation history of the one or more seismic devices. The processor may be configured to transfer data to and from the database and the one or more seismic devices. In embodiments, the data may include one of: (i) a configuration file, (ii) an acquisition parameter, (iii) an operational parameter. In aspects, tithe processor may also be configured to run diagnostics on the one or more seismic devices. The seismic devices may be received inside the module or on a surface of the module.

In embodiments, the processor and database may be configured to perform one of: (i) retrieve and store seismic data received from the plurality of seismic devices; (ii) track a location of each of the plurality of seismic devices, (iii) maintain a record of an operating characteristic of each of the plurality of seismic devices, (iv) maintain an operation history of each of the plurality of seismic devices, and (v) retrieve a unique identifying value from each of the plurality of seismic devices. To facilitate the management of the data, the seismic devices may include a unique identifying value. Thus, the database may store data using the unique identifying values such that data for a particular seismic device may be retrieved by using the unique identifying value for that seismic device. In some arrangements, an operations processor may cooperate with the module processor to retrieve data from the operations database. The retrieved data may relate to one of: (i) an operating status of at least one of the plurality of seismic devices, (ii) an availability of at least one of the plurality of seismic devices; and (iii) a location of at least one of the plurality of seismic devices.

In aspects, the present disclosure provides a method for managing seismic data acquisition activity. The method may include: associating a unique identification value with each of a plurality of seismic devices configured to be deployed in a geological area of interest; compiling data associated with the plurality of seismic devices in a database; positioning a module proximate to the geographical area of interest, the module configured to receive at least one of the plurality of seismic devices; deploying the seismic devices in the geological area of interest; and updating the database using the module and a processor configured to access the database. The method may include retrieving seismic data from the plurality of seismic devices; and storing the seismic data in the database. In aspects, the compiled data may include a usage characteristic of at least one of the plurality of seismic devices. The usage characteristic may include: (i) a location, (ii) an operating characteristic, and (iii) a service history. In some embodiments, each seismic device may include a unique identifying value. The database may store the data using the unique identifying value. In aspects, the compiled data relates to one of: (i) an operating status of at least one of the plurality of seismic devices, (ii) an availability of at least one of the plurality of seismic devices; and (iii) a location of at least one of the plurality of seismic devices.

In embodiments, the present disclosure provides a method for managing seismic data acquisition activity that includes positioning a module proximate to the geographical area of interest, the module configured to receive at least one of the plurality of seismic devices, wherein the plurality of seismic devices includes a plurality of sensor stations; retrieving at least some of the plurality of sensor stations from the geological area of interest to form a group of sensor stations; disposing the group of sensor stations in a container; and transporting the container from the geological area of interest to the module. The group of sensor stations remains in the container while the processor communicates with each of the sensor stations. In arrangements, the method includes forming a plurality of groups of sensor stations; disposing each of the groups in a separate container; and transporting each container from the geological area of interest. The method may further include transporting the container back into the geological area of interest with the same group of sensor stations.

In aspects, the present disclosure provides a system for deploying one or more cableless seismic devices adapted for use in a cableless seismic data acquisition system. An exemplary system includes a module that receives one or more cableless seismic devices. By cableless, it is meant that a cable is not used to form a power or data network among several seismic devices and a central controller. Rather, a wireless transmission media is used for data communication. The module includes a power source that provides electrical power to the seismic devices and a processor programmed to retrieve data stored in the seismic devices. In one arrangement, interface boxes positioned on the module have plugs or receptacles mating with one or more cables from the seismic devices. Via the cables, power is transmitted from the power source to the seismic devices, and data is transfer between the processor and the seismic devices. The module may be configured as a mobile platform that can be transported by land, sea or air vehicles.

In embodiments, the module may be configured to provide power and transfer data simultaneously. In other embodiments, the charging activity and data transfer can occur sequentially or in any other desired manner. To facilitate the charging and data transfer operations, the module can include a display device providing a visual indication of the data transfer status, and/or a power status of a battery associated with the seismic devices. In one configuration, the module is a human habitable structure that includes a first room receiving the seismic devices and a second room receiving the processor. After being recovered from the field, the seismic devices are stored in one such room by affixing each seismic device to a mounting member such as hook on an interior wall. Advantageously, the seismic devices can be arranged in the room in a predetermined manner that can be replicated on the display device. In such a situation, the display device can also provide a visual indication of the location of the seismic devices while displaying the power/charge status.

Advantageously, the processor can be programmed to present the retrieved data on a display device according to a user specified criteria. For example, the processor can filter or sort the retrieved data. In one exemplary operation, the data may be first retrieved from the seismic devices. Next, the retrieved data may be filtered and sorted as needed to assess its quality such as accuracy, the presence of corrupted data or missing data, volume of data, etc. Based on such analysis, field personnel can adjust in-field equipment as needed, reshoot data, or take some other remedial action. These activities can occur before the retrieved data may be subjected to final processing.

In aspects, the present disclosure also provides devices and methods for deploying seismic devices during a seismic data acquisition campaign. In one exemplary arrangement, a pack can be configured to carry devices such as sensor stations, external batteries and sensor units. The pack can include compartments receiving these devices and positioning these devices such that an opening allows cables that connect to these devices to extend out of the shell. Each compartment can be configured to snugly or closely receive a particular device. The shell can include a connection member that connects the shell to the mounting member of the module. The connection member can also allow the shell to be affixed to a vehicle such as a helicopter or strapped to a human operator. The shell also includes a back face enclosed by a panel held in a closed position by one or more straps or belts. Releasing the straps or belts allows the panel to be moved and thereby provide access to the seismic devices in the compartments. The shell can also be formed to be releasably attachable to a frame. The frame can be an adjustable tubular structure that may be configured as needed to be comfortably worn by a human crew member.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and will form the subject of the claims appended hereto.

BRIEF DESCRIPTION OF THE DRAWINGS

The novel features of this disclosure, as well as the disclosure itself, will be best understood from the attached drawings, taken along with the following description, in which similar reference characters refer to similar parts, and in which:

FIG. 7 illustrates one embodiment of a power/data download status map according to the present disclosure;

FIG. 8 illustrates an exemplary GUI interface for a filter function according to the present disclosure;

DETAILED DESCRIPTION OF THE DISCLOSURE

Figure 1:
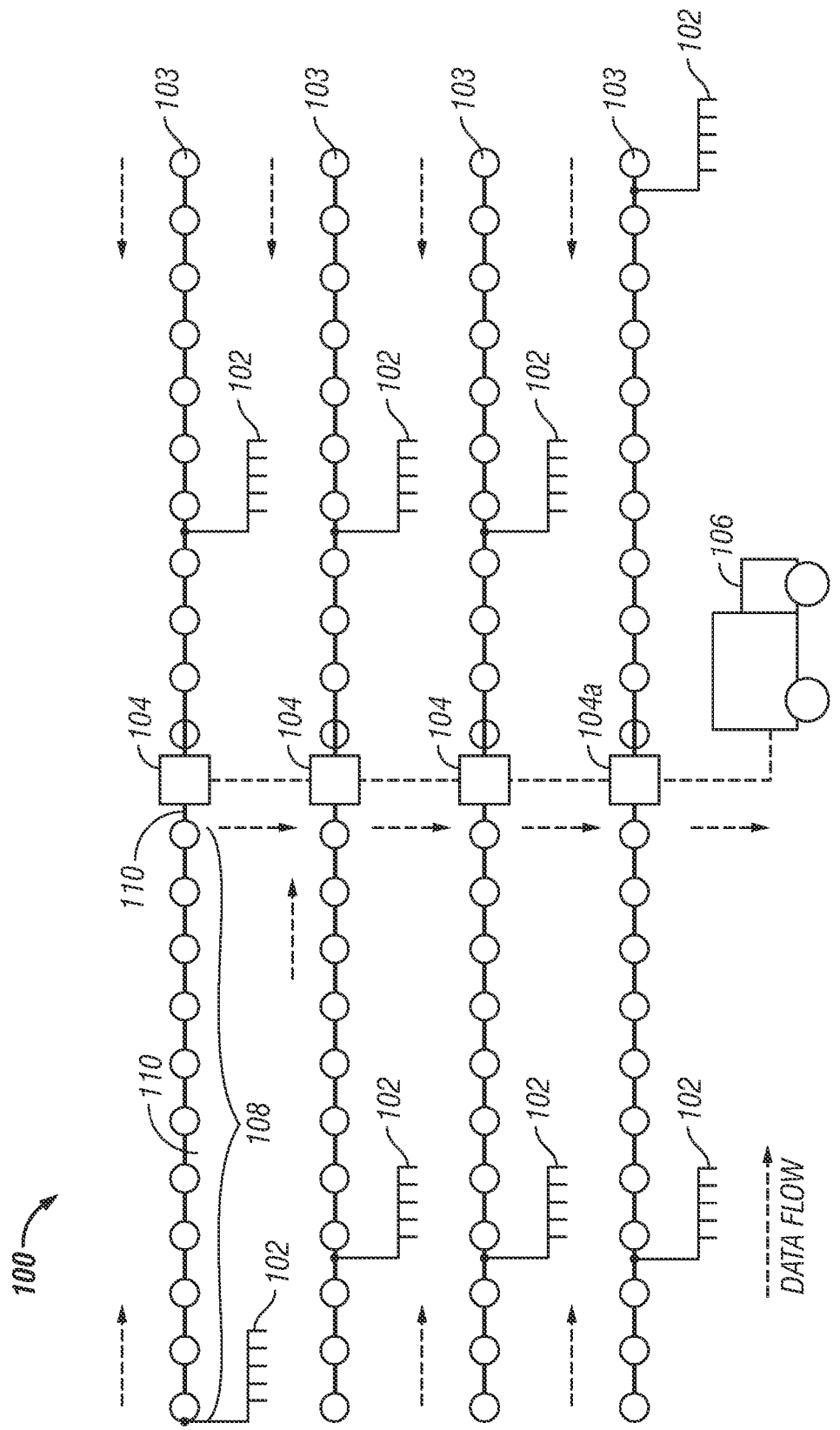
FIG. 1 schematically illustrates a cable seismic data acquisition system.

In aspects, the present disclosure relates to devices and methods for controlling activities relating to and managing assets used during seismic data acquisition. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. The methods and devices of the present disclosure may be utilized with any type of seismic data acquisition system that utilize in-field and/or centralized control. For context, the equipment and components of two illustrative systems are discussed below.

FIG. 1 depicts a typical cable-based seismic data acquisition system 100. The typical system 100 includes an array (string) of spaced-apart seismic sensor units 102. Each string of sensors is typically coupled via cabling to a data acquisition device (field box) 103, and several data acquisition devices and associated string of sensors are coupled via cabling 110 to form a line 108, which is then coupled via cabling 110 to a line tap or (crossline unit) 104. Several crossline units and associated lines are usually coupled together and then to a central controller 106 housing a main recorder (not shown). One sensor unit 102 that is in use today is a velocity geophone used to measure acoustic wave velocity traveling in the earth. Other sensor units 102 that may be used are acceleration sensors (accelerometers) for measuring acceleration associated with the acoustic wave. Each sensor unit may comprise a single sensor element or more than one sensor element for multi-component seismic sensor units.

The sensors 102 are usually spaced at least on the order of tens of meters, e.g., 13.8-220.0 feet. Each of the crossline units 104 may perform some signal processing and then store the processed signals as seismic information for later retrieval. The crossline units 104 are each coupled, either in parallel or in series with one of the units 104a serving as an interface with between the central controller 106 and all crossline units 104.

Figure 2:
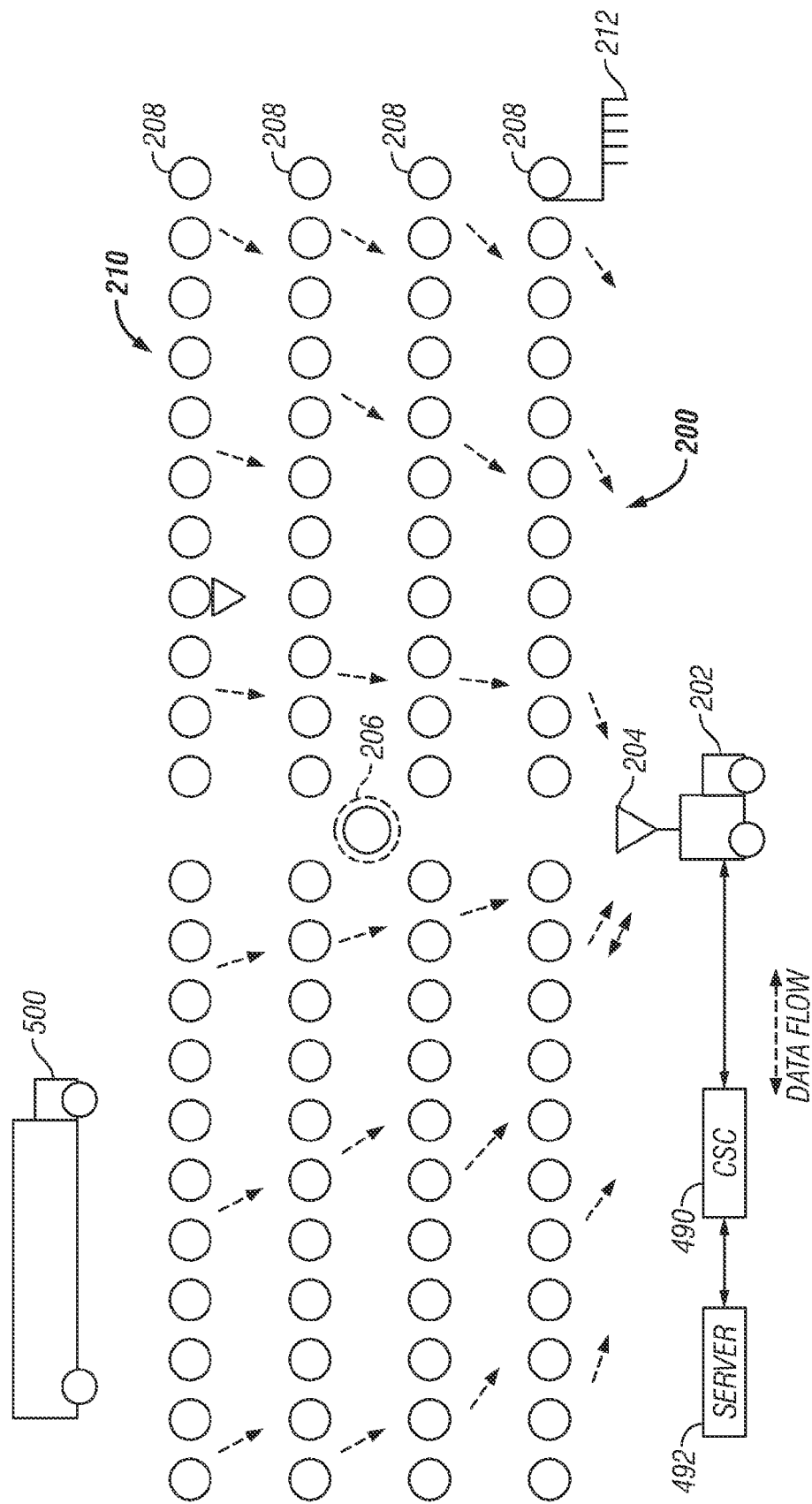
FIG. 2 schematically illustrates a wireless seismic data acquisition system.

Referring to FIG. 2 there is schematically shown a wireless seismic data acquisition system. The system 200 includes a central controller 202 in direct communication with each of a number of wireless sensor stations 208 forming an array (spread) 210 for seismic data acquisition. Each sensor station 208 includes one or more sensors 212 for sensing seismic energy. Direct communication as used herein refers to individualized data flow as depicted in FIG. 2 by dashed arrows. The data flow may be bi-directional to allow one or more of: transmitting command and control instructions from the central controller 202 to each wireless sensor station 208; exchanging quality control data between the central controller 202 and each wireless sensor station 208; and transmitting status signals, operating conditions and/or selected pre-processed seismic information from each wireless sensor station 208 to the central controller 202. The communication may be in the form of radio signals transmitted and received at the central controller 202 via a suitable antenna 204. The term "seismic devices" includes any device that is used in a seismic spread, including, but not limited to, sensors, sensor stations, receivers, transmitters, power supplies, control units, etc. As used herein the term "wireless" or "cableless" is intended to describe an arrangement wherein communication or data transfer between a sensor station 208 and a central controller 202 does not utilize wire conductors. There can be, of course, cables and wires that connects the sensor station 208 and local components such as the sensing devices or external batteries. Thus, in general, a wireless or cableless seismic device is one that does not utilize wires or cables to communicate with a central control unit. Each sensor station 208 has a single sensor and a cable connected between one station and one sensor.

The controller 202, the central station computer (CSC) 490 and a central server 492 exert control over the constituent components of the system 200 and direct both human and machine activity during the operation of the system 200. As discussed in greater detail below, the CSC 490 automates the shooting of the sources 206 and transmits data that enables the sensor stations 208 to self-select an appropriate operating state during such activity. The server 492 may be programmed to manage data and activities over the span of the seismic campaign, which may include daily shooting sequences, updating the shots acquired, tracking shooting assets, storing seismic data, pre-processing seismic data and broadcasting corrections. Of course, a single controller may be programmed to handle most if not all of the above described functions. For example, the CSC 490 may be positioned in or integral with the controller 202. Moreover, in some applications it may be advantageous to position the controller 202 and CSC 490 in the field, albeit in different locations, and the server 492 at a remote location.

The controller 202, the central station computer (CSC) 490 and a central server 492 exert control over the constituent components of the system 200 and direct both human and machine activity during the operation of the system 200. The server 492 can be programmed to manage data and activities over the span of the seismic campaign, which can include daily shooting sequences, updating the shots acquired, tracking shooting assets, storing seismic data, pre-processing seismic data and broadcasting corrections. Of course, a single controller can be programmed to handle most if not all of the above described functions. For example, the CSC 490 can be positioned in or integral with the controller 202. Moreover, in some applications it may be advantageous to position the controller 202 and CSC 490 in the field, albeit in different locations, and the server 492 at a remote location.

Typically, seismic data acquisition is performed in separate stages or phases that can span several days or weeks. In some campaigns, the stages involve a progression of surveys, each performed over different regions of interest. This staged approach can be necessary due to a relatively large surface area under investigation and a limited number of available sensor stations 208. Thus, for instance, after seismic data has been acquired from a first region of interest by a set of sensor stations 208, this set of sensor stations 208 are redeployed into a second region of interest and so forth. Prior to redeployment, the seismic data residing in the sensor stations 208 can be downloaded and any on-board power supplies recharged. Additionally, the sensor stations 208 may require calibration, refurbishing, diagnostics or other in-field maintenance. Moreover, personnel may require various types of data in order to efficiently utilize the sensor stations 208 and other seismic devices ("assets"). Such data may include: data uniquely identifying the one or more seismic devices, data relating to a location of the one or more seismic devices, data relating to an operating characteristic of the one or more seismic devices, and data relating to an operation history of the one or more seismic devices. Such information may be useful to identify which assets are available for deployment, which assets are due for maintenance or require hardware/software upgrades, which assets may have performance-related issues, etc.

To effectively manage the assets of seismic data acquisition systems, a mobile control module 500 may be transported and positioned proximate to a geographical region of interest. In the course of redeployment of sensor stations 208, these sensor stations 208 may be transported to and operatively connected to the control module 500. The control module 500 accesses and retrieves seismic data in the sensor stations 208. In conjunction with the retrieval of seismic data, number other tasks may be executed at the control module 500. For example, power supplies in the control module 500 may charge internal batteries associated with the sensor stations 208. The control module 500 can also retrieve data without charging the internal batteries, such as when the sensor stations 208 are not intended for immediate redeployment. In embodiments, removable batteries, whether internal or external, may be replaced with fully charged batteries so that no recharging is performed while data is being downloaded from the sensor stations 208. Additionally, tasks such as diagnostics, software upgrades, inventory or logistics related activities, and configuring sensor stations 208 may also be performed at the control module 500.

To better appreciate the functionality and advantages of the control module 500, the components of an exemplary sensor station 208 are discussed below. Thereafter, the features and aspects of the control module 500 will be discussed in greater detail.

Figure 3A:
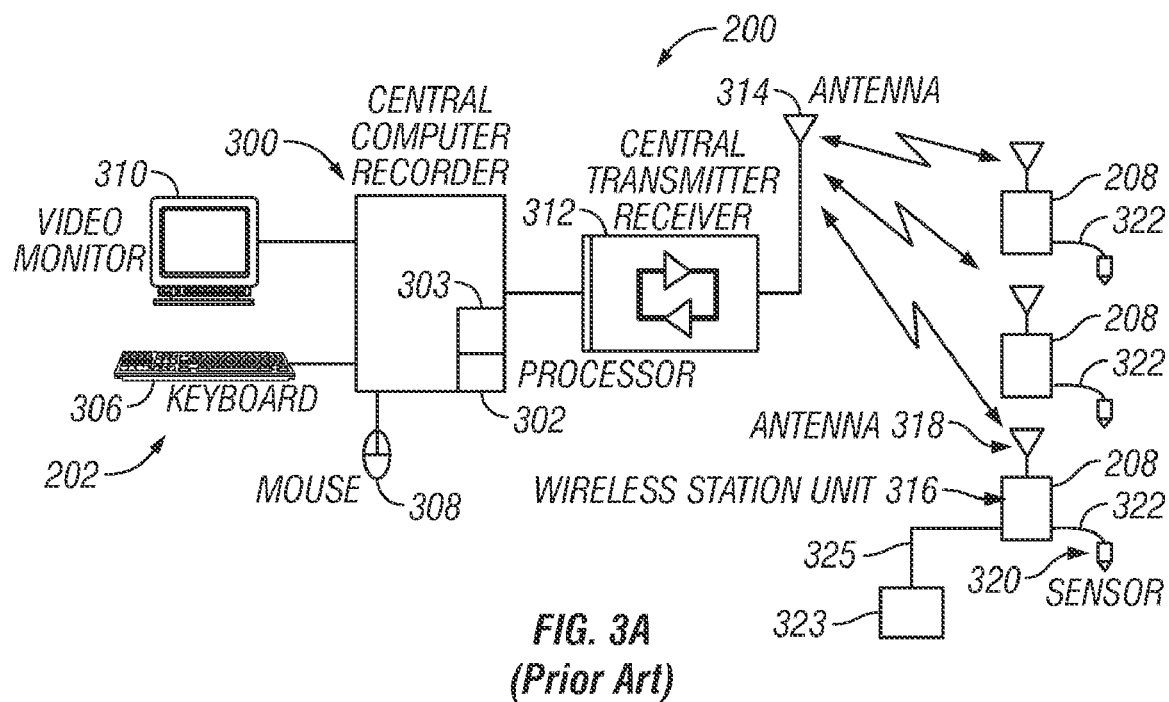
FIG. 3A shows a schematic representation of the system of FIG. 2 in more detail.

FIG. 3A is a schematic representation of the system 200 in more detail. The central controller 202 includes a computer 300 having a processor 302 and a memory 303. An operator can interface with the system 200 using a keyboard 306 and mouse or other input 308 and an output device such as a monitor 310. Communication between remotely-located system components in the spread 210 and the central controller 202 is accomplished using a central transmitter-receiver (transceiver) unit 312 disposed in the central controller 202 along with an antenna 314.

Figure 3B:
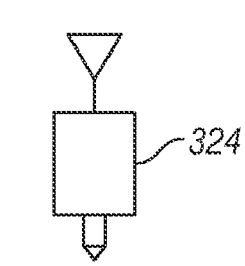
FIG. 3B shows one embodiment of a wireless station unit having an integrated seismic sensor.

The central controller 202 communicates with each wireless sensor station 208. Each wireless sensor station 208 shown includes a wireless station unit 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 can be coupled to a corresponding wireless station unit by a relatively short cable 322, e.g., about one meter in length, or coupled by integrating a sensor unit 320 with the wireless station unit 316 in a common housing 324 as shown in FIG. 3B. In certain situations, the expected in-field service time may exceed the power capacity of internal battery sources (e.g., battery 422 of FIG. 4). In certain embodiments, an external battery 323 can be connected to the sensor station 208 via a suitable cable 325. The external battery 323 increases the amount of power available to the sensor station 208 and thereby increases the in-field service life of the sensor station 208.

Figure 3C:
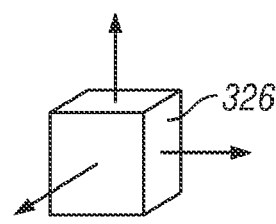
FIG. 3C illustrates a multi-component sensor for use in one embodiment of the present invention.

One sensor for use in a sensor unit 320 might be a multi-component sensor 326 as shown in FIG. 3C. The multi-component sensor shown includes a three-component accelerometer sensor incorporating micro electro-mechanical systems (MEMS) technology and application-specific integrated circuits (ASIC) as found in the Vectorseis sensor module available from Input/Output, Inc., Stafford, Tex. The present disclosure, however, does not exclude the option of using velocity sensors such as a conventional geophone or using a pressure sensor such as a conventional hydrophone. Any sensor unit capable of sensing seismic energy will provide one or more advantages of the present disclosure. Furthermore, the present disclosure is useful using a single sensor unit 320 as shown, or the sensor unit 320 might include multiple sensors connected in a string.

Figure 4:
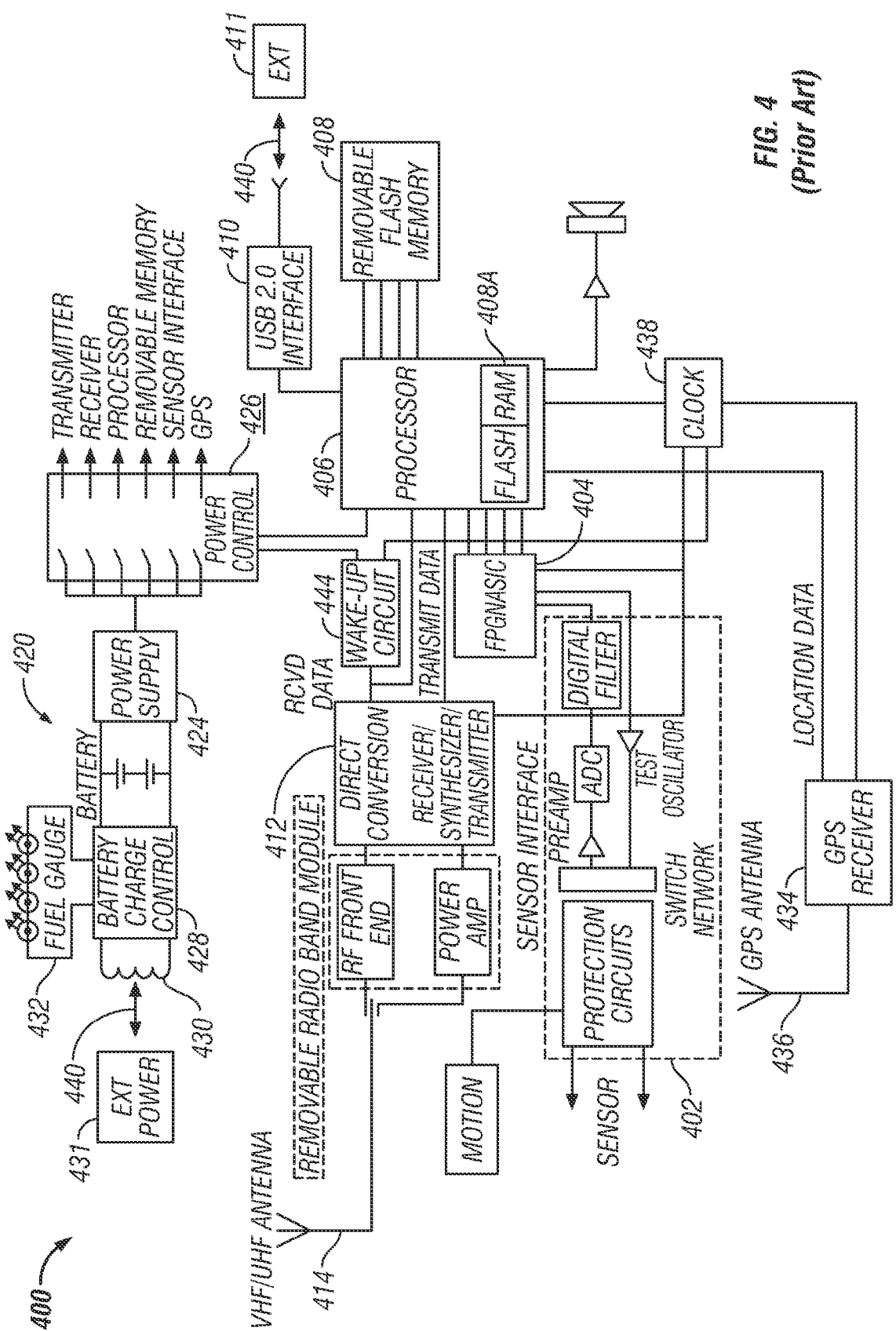
FIG. 4 is a schematic representation of a wireless station unit incorporating circuitry to interface with an analog output sensor unit.

FIG. 4 is a schematic representation of a wireless station unit 400 according to the present disclosure that operates as a data recorder incorporating circuitry to interface with an analog output sensor unit (not shown). The wireless station unit 400 is an acquisition device that includes a sensor interface 402 to receive an output signal from the sensor unit. The sensor interface 402 shown includes a protection circuit, switch network, a preamplifier, a test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The information can be in digital form for storage in a storage device 408, also referred to herein as a memory unit. The memory unit can be removable as shown at 408 and/or dedicated 408a with a coupling 410 for providing access to the stored information and/or for transferring the stored information to an external storage unit 411. The coupling 410 may be a cable coupling as shown or the coupling might be an inductive coupling or an optical coupling. Such couplings are known in the art and thus are not described in detail. The memory 408, 408a can be a nonvolatile memory of sufficient capacity for storing information for later transfer or transmission. The memory might be in the form of a memory card, removable miniature hard disk drive, an Electrically-Erasable Programmable Read Only Memory (EEPROM) or the like.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 shown is a direct conversion receiver/synthesizer/transmitter circuit and can alternatively be implemented as a software-defined radio transceiver. Alternatively, the transmitter/receiver circuit 412 might be any suitable circuit providing transceiver functions such as a transceiver utilizing superheterodyne technology, for example. Location parameters (e.g., latitude, longitude, azimuth, inclination, etc.) associated with a particular wireless sensor station help to correlate data acquired during a survey. These parameters are determined prior to a survey using a selected sensor location and nominal sensor orientation and the parameters can be adjusted according to the present disclosure. The location parameters are stored in a memory 303, 408 either in the central controller or in the station unit 400. In one embodiment, the wireless sensor station includes a global positioning system (GPS) receiver 434 and associated antenna 436. The GPS receiver in this embodiment is shown coupled to the processor 406 and to a clock circuit 338 to provide location parameters such as position and location data for correlating seismic information and for synchronizing data acquisition.

Local power is provided by a power supply circuit 420 that includes an on-board rechargeable battery 422. The battery 422 might be of any suitable chemistry and might be nickel-metal hydride (NMH), a lithium-ion or lithium-polymer rechargeable battery of adequate size for the particular application. The battery provides an output to a power supply 424 to condition and regulate power to downstream circuits and the power supply output is coupled to a power control circuit 426 for distributing power to various local components. The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

As described above, the external equipment interacts with the sensor station 208 to, in part, retrieve data from the memory module 408 and to charge the rechargeable batteries 323, 422. In one embodiment, a single cable 400 includes a data conductor that transmits data between the external equipment and the memory module 408 and other components of the sensor station 208 and a power conductor that transfers electrical power from an external source to the power circuit 420. The cable 440, which can be formed of metal wire or optical fibers, provides a consolidated connection device for operatively connecting the sensor station 208 to one or more external devices. The sensor station 208 can also include one or more external batteries.

Another optional feature is a wake up circuit 444 that allows the wireless station unit to control power consumption from the battery throughout different operating modes. The wake up circuit 444 can be triggered by a number of specified sources; e.g., the radio receiver 412, the clock 438, a motion sensor or environmental condition sensor (not shown). Still another optional feature is a wireless station unit 400 that includes a motion sensor 440 to detect unwanted movement of the station unit or to detect around the station unit, in which a proximity sensor might be used. Such unwanted movement might be caused by wildlife interfering with the unit, soil movement or the like.

From the above, it should be appreciated that in some embodiments the sensors stations 208 can store acquired seismic data for later retrieval and that the sensor stations 208 utilize numerous electronic components that consume electrical energy from internal and external batteries. Advantageously, the control module 500 can be positioned in-field and proximate to the seismic data acquisition activity to retrieve this seismic data and recharge the power supplies of the sensor stations 208. Additionally, the control module 500 can be adapted as necessary to execute any number of post-acquisition functions in relation to the sensor station 208 and other seismic devices.

Figure 5:
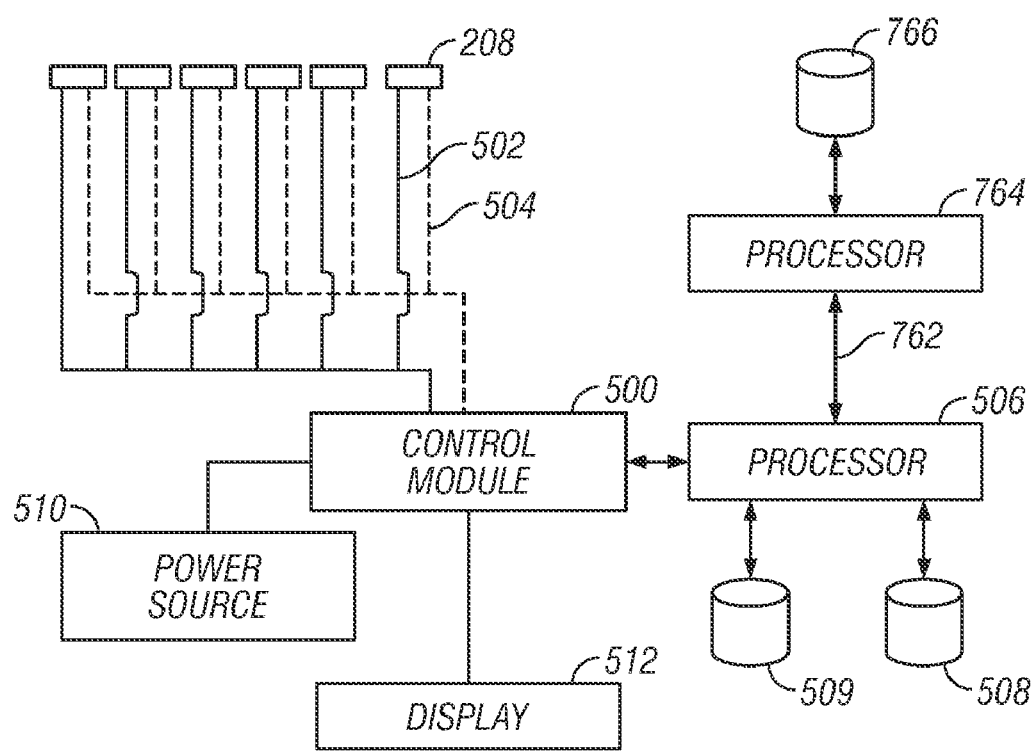
FIG. 5 is a block diagram of the functional aspects of an exemplary control module according to the present disclosure.

Referring now to FIG. 5, there is shown in block diagram format the functional relationship between a control module 500 and the sensor stations 208. As shown, a control module 500 can be operatively connected to a plurality of sensor stations 208. While only a few sensor stations 208 are shown, the control module 500 can be configured to connect with several hundred sensor stations 208. The connection between the control module and the sensor stations 208 includes one or both of a data connection 502 and a power connection 504. The connection can be via one or more cables having power and/or data conductors. For example, the cable 440 of the sensor station 208 (FIG. 4) can be used for the connection.

One or more processors 506 associated with the control module 500 use the data connection 502 to retrieve data from the sensor station 208 and write the retrieved data to one or more databases 508. The processor 506 can also use the data connection 502 to transmit data to the sensor station 208. For instance, the processor 506 can perform diagnostics on electronics in the sensor station 208 or program microprocessors with appropriate instructions. The power connection 504 transmits electrical power from a power source 510 to the batteries of the sensor stations 208. The power source 510 may be a local source such as a local generator, and/or a remote source. Advantageously, the data connection 502 and the power connection 504 can transmit power and data simultaneously, which can reduce the time needed to redeploy the sensor stations 208. In one embodiment, the database 508 may be configured to store seismic data and a database 509 may be configured to store data related to inventory, logistics, maintenance, location, performance, operations, etc.

Figure 6A:
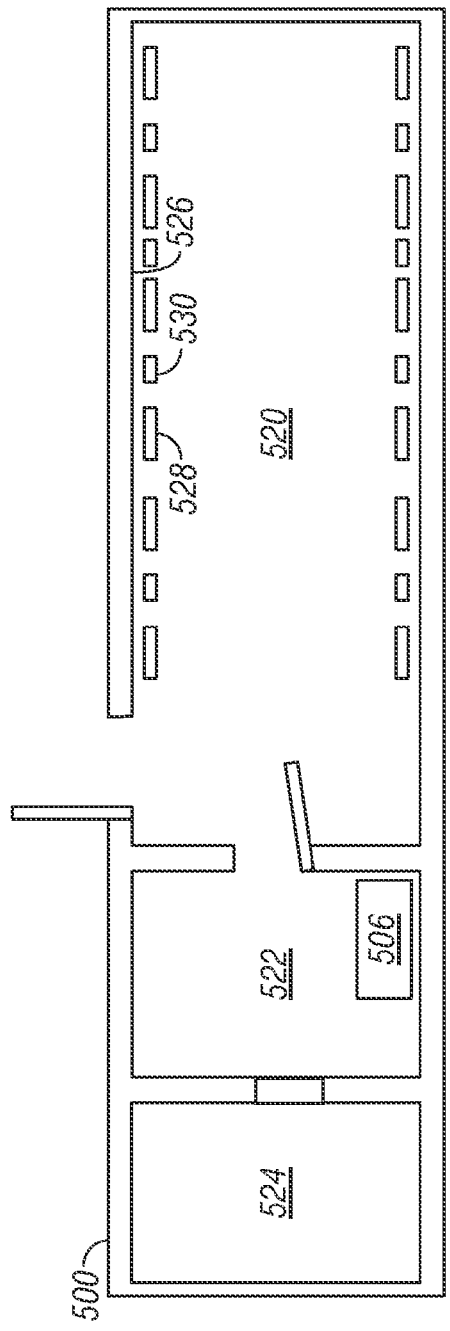
FIGS. 6A and 6B schematically illustrate embodiments of a control module according to the present disclosure.
Figure 6B:
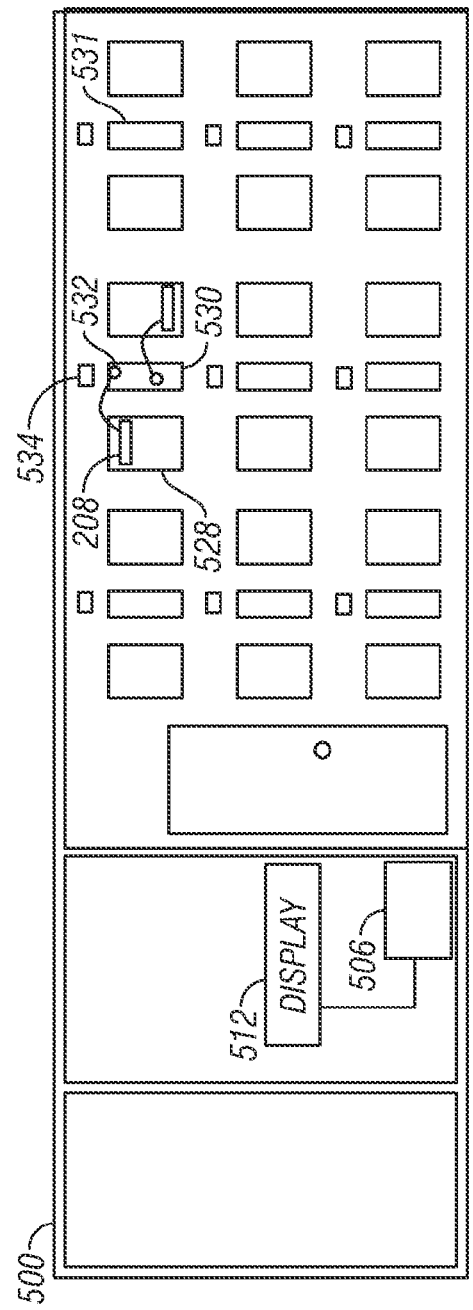

Referring now to FIGS. 6A and 6B, there are shown a top view and a side view, respectively, of one embodiment of a control module 500 made in accordance with the present disclosure. The control module 500 may be configured as a mobile platform that can be transported by a vehicle such as a truck, boat, train, helicopter (not shown) to a geographical area of interest. In other embodiments, a vehicle can be modified to include one or more features of the control module 500. The control module 500 includes one or more storage areas such as a room 520 in which the sensor stations 208 are stored after being retrieved from the field by personnel. Additional rooms, such as rooms 522 and 524, can be formed to house the processor 506 and related electronics and devices such as HVAC units (not shown), respectively. The rooms 520, 522 can be climate controlled and the HVAC units (not shown) are sized to maintain a temperature controlled environment suitable for the sensitive electronic equipment housed in the module 500. The control module 500 can utilize a power distribution system (not shown) that includes A/C electrical circuits and breakers for meeting equipment power requirements and appropriate cables for connecting to an external power generator.

In one arrangement, the room 520 includes one or more surfaces 526 on which the sensor stations 208 can be positioned. In one arrangement, a portable container 528 may be used to handle and secure the sensor stations 208. The container 528 can be coupled to the surface 526 using suitable devices such as hooks or clasps. The container 528 can include a plurality of compartments, each of which may be formed to receive the individual components of a sensor station 208. As described previously, each wireless sensor station 208 can include a wireless station unit 316, an antenna 318 compatible with the antenna 314 used with the central controller 202, and a sensor unit 320 responsive to acoustic energy. Additionally, each sensor unit 320 can be coupled to a corresponding wireless station unit by a relatively short cable 322 (FIGS. 3A and 4). For instance, one container 528 can holds a group of six sensor stations 208 and related equipment. Embodiments of the container 528 will be discussed in greater detail later. In other embodiments, the sensor stations 208 can be individually mounted onto the surfaces 526. This arrangement of sensor stations 208 in a column and row format can be replicated or represented on a display 512 or via a different display device, which can facilitate the identification of a given sensor station because of the relative spatial correspondence of a displayed signal for the sensor station with the physical location of that sensor station in the room 520. As also will be discussed in further detail, the display 512 can be used to provide a status of the data retrieval and power charging state for each sensor station.

As best seen in FIG. 6B, the surface 526 can include a plurality of interface boxes 530 that mate with the power connection 502 and the data connection 504. While the power connection 502 and the data connection 504 are shown separately, in embodiments, as noted above, a single cable 440 (FIG. 4) from the sensor station 208 can incorporate conductors adapted for both purposes. Therefore, in one arrangement, each interface box 526 includes appropriate connection devices such as plugs or receptacles 532 to connect with the cables of the sensor stations 208. For data transfer, the receptacles 532 can connect to an Ethernet or bus (not shown) that communicates with the processor 506 via a data download network (not shown). In one embodiment, Ethernet connectors on the exterior of the interface box 530 are numbered to correspond with the sensor station input connectors to which they connect. The data download network consists of a series of Ethernet switches that route signals from the sensor stations 208 in the room 520 to the processor 506 in room 522. The data download network can employ redundancy and automatic data path re-routing in the event of a switch or cable failure. In other embodiments, the communication and data transfer can use wireless transmission media such as radio signals or infrared signals. Thus, in some embodiments, an interface box 530 may be omitted because the sensor stations 208 do not utilize cables 440 (FIG. 4). For power, the receptacles 532 in one embodiment connect to local external power supplies.

In other embodiments, a box can be configured for either only data transfer or only power transfer. For example, a power box 531 can include one or more 15V nominal 600 watt power supplies 534 capable of charging external batteries 323 (FIG. 3A) for the sensor stations 208. In certain embodiments, the power box 531 can be a modular and self-contained power supply positioned as needed. For instance, as shown in FIG. 6B, the power box 531 may be mounted on the surface 526 inside the module 500. However, the power box 531 can configured as a movable device that can be positioned on a floor or external location. In such embodiments, the box 531 includes the appropriate power supply electronics to receive power from an external source. In embodiments, the power box 531 can include compartments or shelves (not shown) into which the external batteries can be positioned during charging.

The power supplies 531, 534 can contain a current limiting or current fold-back feature that prevents damage to the batteries within the sensor stations 208. Thus, it should be appreciated that the power supplies 531, 534 can be used to charge batteries external to a sensor station 208 as well as internal to the sensor station 208.

In other embodiments not shown, the control module 500 can utilize exterior mounting surfaces for receiving the sensor stations 208. Additionally, it should be understood that the processor 506 and related equipment can be situated either at or near the control module 500 or in a remote location. In such embodiments, the control module 500 can utilize known communication devices to exchange data with a remote processor. Thus, it should be appreciated that the functionality of the control module 500 does not require the use of interior spaces or local support equipment. Furthermore, while one control module 500 is shown, it should be understood that two or more control modules may also be utilized. With a multiple control module configuration, the control modules can be all at one location or dispersed in several different locations. Also, a common processor or common processors may service all the control modules or each module may have its own dedicated processor.

Referring now to FIG. 7, the data retrieval and battery charging can be monitored and controlled using a computer generated digital map 540 presented on the display 512. One exemplary display map 540 visually represents each of the sensor stations 208 in approximately the same column and row format as the sensor stations 208 are positioned in the room 520. Of course, other arrangements can also be used. For each sensor station 208, the map 540 indicates the status of the charging activity with a charging indicator 542, the status of the data download with a download indicator 544, and a corresponding identification number 546. In one arrangement, the processor 506 in real time or periodically determines the progress of data retrieval from each sensor station 208 and causes the data indicator 544 to emit an appropriate signal. The charge indicator 542 may be used to track the charge status for the internal and / or the external batteries of the sensor stations 208. In one non-limiting scenario, the data retrieval and the power status uses three signals; a failed or disconnected signal 550, an in progress signal 552 and a finished signal 556. The signals can include colors (e.g., green, red, blue, etc.), steady or blinking lights or other information bearing signals. For example, for sensor station 208x, the identification number may be displayed as S/N "11115," the data indicator 542 shows that downloading is complete and the charge indicator 544 shows that charging is in progress. Further, additional information such as the amount of data downloaded or charging capacity reached. For instance, a percentage, such as "50%," can be displayed to show how much data has been downloaded or how much the batteries have been charged. It should be understood that the map 540 can be configured in a variety of formats. For example, the map 540 can show only the sensor stations that are ready for re-deployment or only the sensor stations that are not connected. In other arrangements, the map 540 can show only the containers 528 that have all sensor stations ready for deployment. Thus, the map 540 can be adjusted to display power and charging status for sensor stations that meet one or more selected conditions. The map 540 can be constructed utilizing known data processing software such as EXCEL® spreadsheets and displayed via conventional display devices. It should be appreciated that the status map 540 enables personnel to quickly identify the identity and location of sensor stations 208 that are ready for deployment as well as those sensor stations 208 that are malfunctioning or otherwise not connected.

As noted previously, the processor 506 can utilize the data connection 502 to upload instructions or perform diagnostics for the sensor stations 208. In addition to displaying the status of data retrieval and charging, the status or progress of such activities can also be displayed on the map 540 or a different display device. Similarly, the processor 506 can analyze the data retrieved from each of the sensor stations, determine whether the retrieved data could be improved, and reconfigure the electronics or the sensor as needed. Progress of this activity can also be shown on the map 540 or a different display device. The processor 506, however, can be programmed to manage, manipulate and present data both during and after retrieval from the sensor stations 208.

In an exemplary mode of operation, the processor 506 receives seismic data recorded from the sensor stations 208 in the manner previously described, performs preliminary processing and outputs data in one or more selected formats for further processing, analysis and/or archiving. The processor 506 may also be connected to a printer/plotter (not shown) for printout and analysis of seismic data recording and processing arrangements in the field. The sensor stations 208 may also store a uniquely identifying value that may be communicated to the processor 506 after the control module 500 receives the sensor stations 208. The processor 506 may also automatically retrieve the stored unique identifying value and update a database such the database 508 or the database 509.

Advantageously, the processor 506 can be programmed to allow a user to view and analyze the seismic data at any time during the retrieval, storage, and transfer process. Referring still to FIG. 5, the processor 506 can be programmed to organize seismic data in accordance with a user defined criteria and present the seismic data on the display device 512. In one embodiment, the processor 506 includes instructions that perform a filter function that allows a user to define criteria for the presentation of seismic data information in the domain windows of a graphical user interface (GUI) on the display 512 and that allow the user to reorganize the presented seismic data.

In one arrangement, the GUI utilizes types of Domain windows that are selected to present seismic data according to the function, nature or data source of interest. Within these domains, data presentation may be reorganized through sorting or customized based on user-defined criteria through filtering. Each function optimizes the utility of the data presented. Exemplary characteristics for a filter include, but are not limited to: Shot ID; EP; Source Line; Source Station; File Number; Number of Samples; Trace Size; Time Stamp; Data Use; X; Y; Z; Z-Datum; Sample Interval; Correlated; Julian Day; Hour; Minute; Second; Status; Lat Test Type; Uphole; Box Function; Event Type; Sensor Type; VSM Serial; VSM Version; and VSM Revision.

Referring now to FIG. 8, there is shown an exemplary domain window 700 for applying one or more desired filters for retrieved seismic data. The window includes a column 702 for selecting one or more characteristics to be used for filtering, an operator cell 710 that functions as a search criteria for the selected characteristic, and one or more value cells 720, 722 that set the limits or target for the search criteria. The column 702 can include any of the characteristics listed above. Upon selection of a characteristic in the column 700, the processor 506 presents the appropriate operators for the selected characteristic in the operator cell 710. The user manually enters desired values in the value cells 720, 720 to define the operator. Thereafter, the user initiates the filtering operation by clicking on a GUI button such as the shown "OK" button. The domain window 700 then shows only those lines of retrieved seismic data that meets the parameter(s) set in the filter function request.

Figure 9:
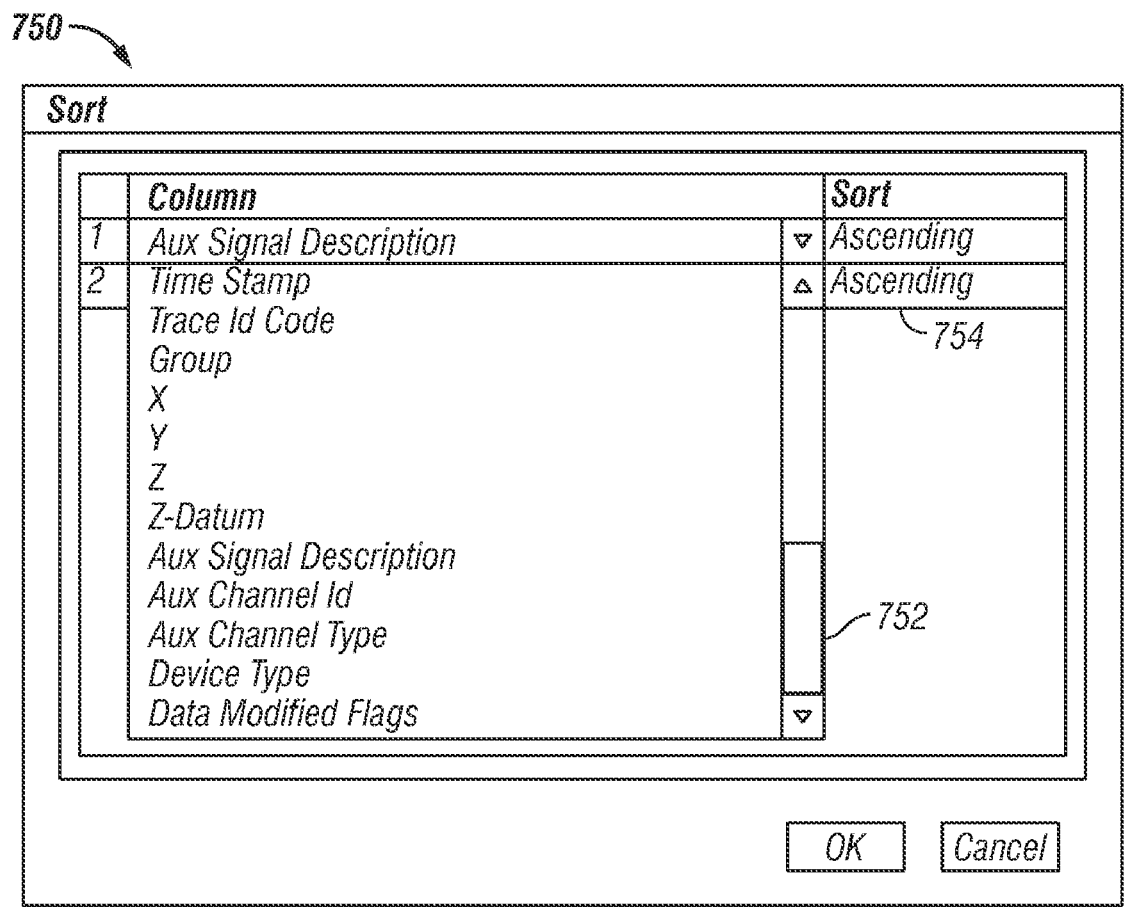
FIG. 9 illustrates an exemplary GUI interface for a sort function according to the present disclosure.

A similar arrangement can be utilized for a sort function. For example, the GUI can present one or more domain windows that sort data based on user-defined criteria. Exemplary characteristics for a sorting include, but are not limited to: PDC Serial; FSU Serial; Status; Source Line; Source Station; Shot ID; EP; Point Index; Time Stamp Receiver Line; Receiver Station; Component; Trace ID Code; Group; X:Y; Z; Z-Datum; Aux Signal Description; Aux Channel Id; Aux Channel Type; Device Type; Data Modified Flags. Referring now to FIG. 9, there is shown an exemplary domain window 750 for sorting retrieved seismic data according to one or more user selected criteria. The window 750 includes a column 752 for selecting one or more characteristics to be used for sorting and an order cell 754 that orders the data in a desired manner (e.g., ascending, descending, etc.). The user manually selects the sort criteria and the desired order. Thereafter, the user can click an "OK" button to initiate the sort function. The domain window 750 then shows the retrieved seismic data sorted in the desired manner.

It should be appreciated that utilization of the described filter and sort functionality enables an in-field evaluation of the quality and usefulness of the acquired seismic data. As described previously, in one embodiment, the control module 500 and the processor 506 are positioned proximate to the region where seismic surveying is taking place. Thus, the processor 506 programmed with the instructions for the filter and/or sort functions described above enable ground personnel to analyze the effectiveness of the seismic campaign contemporaneously with the on-going activity. For example, rather than analyzing data in a fixed and non-modifiable format, the process 506 can be used to identify potential errors or discrepancies in the acquired data, which then enables immediate corrective action such as recalibration of sensor stations 208 or changes to the shot pattern. It should also be appreciated that the processor 506 and described filter and sort functions provide a "quick look" at the acquired seismic data without need for time consuming processing of data. That is, the filter and sort functions of the processor 506 can be applied to raw or partially processed data in the field, which allows field personnel institute any corrective action early on in the seismic data acquisition activity.

As noted previously, the efficient management of the above-described seismic devices may require support activities involving: performing diagnostics on the seismic devices, the tracking of a location of each seismic device, maintaining a record of an operating characteristic of each seismic device, and/or maintaining an operation history for each seismic device. Efficient management may include ensuring that the in-field devices have the most up-to-date hardware and software and been subjected to the appropriate service and maintenance. Moreover, efficient utilization may include strategic use of the available "assets" over the course of a seismic campaign. For instance, sensor stations may be continuously shifted or moved from one area of seismic investigation to the next. The effective management of these seismic device may reduce the likelihood that few, if any, seismic devices are over-utilized, under-utilized or used in inappropriate situations Referring now to FIG. 5, there is shown one embodiment of a system for maintaining a database that may be used to manage the assets deployed during a seismic data acquisition campaign. In one embodiment, the processor 506 accesses the database 509, which as noted previously may include data relating to the deployment, operation and configuration of the seismic devices being used. As noted previously, after the sensor stations 208 have been received by the control module 500, the sensor stations are connected to the processor 506. At this time, the processor 506 may perform a variety of functions, of which some illustrative examples are discussed below.

One function may be to update the database 509 with data related to logistics and inventory control. As the sensor stations 208 report their unique identification values, the processor 506 may update the database 509 with the current location of the received sensor stations 208, the number of in-field service hours, encountered operating errors, etc. and other related information using the unique identification values. It should be appreciated that this automated methodology for retrieving the unique identification values eliminates the potential errors that may arise using a human operated bar code reader or other method that requires human assistance in either the retrieval or entry of a unique identification value.

Another function may be to perform diagnostics on the sensor stations 208 or other seismic devices. For example, the diagnostics may include performing tests on the electronic components of the wireless station unit 316 (FIG. 3A) or the sensor unit 320 (FIG. 3A) to determine whether these components and devices are performing according to pre-defined operating specifications. The tests may utilize pass/fail thresholds for accuracy, responsiveness, consistency, etc. using various test signals applied the components of the sensor station 208. The tests may also include checks on the condition of the sensor station 208. For example, the tests may include environmental tests for humidity or moisture to determine whether the sensor station 208 has a sealed internal atmosphere. The tests may be self initiated or user initiated. That is, the diagnostics may be configured to be an automated operation or implemented as needed. The processor 506 may also perform calibration as needed for theses seismic devices.

Another function may be to configure the sensor station 208 for subsequent deployment. For example, the processor 506 may load the sensor station 208 with data that enables the sensor station 208 to acquire seismic data in accordance with a pre-determined seismic data acquisition plan (e.g., a shot plan). In one arrangement, the processor 506 may load the sensor station 208 with one or more configuration data files. During seismic data acquisition, one or more of these loaded configuration data files may be utilized by the sensor station 208 to control the in-field behavior or operation of the sensor station 208. The operation or behavior may be related to functions that include, but are not limited to, the measuring of seismic energy, the writing of data indicative of the measured seismic energy to a data storage medium, the response of the sensor station 208 to an event or condition that may impact a functional aspect of the sensor station 208 (i.e., an "out-of-norm" condition or event), and the protocols or method the sensor station 208 uses to communication with other external devices. In some embodiments, the configuration data files may include acquisition parameters such as sample rates, record lengths, filter configurations, etc. The configuration data files may also include operational parameters such as alarms for low battery power, maximum operating temperature, maximum noise, etc. Thus, a sensor station 208 may be configured to report one or more of these conditions such as low battery levels, excessive noise, once a preset threshold value for such a condition has been reached. Other operational parameters may include available communication frequencies that may be in a "look-up" table. The sensor station 208 may reference the "look-up" table to select the most suitable frequency for signal transmission. Still another operational parameter may include a "shot template" that enables the sensor station 208 to determine whether or not to change operating states to prepare for a given shot. For example, the "shot template" may be a mathematical expression or geometric shape that may be referenced by the sensor station 208 to determine whether to record seismic data from a source that is to be activated. In some embodiments, the CSC 490 (FIG. 2) may transmit a signal that instructs the sensor stations 208 to select one configuration data file from a plurality of different configuration data files. Thus, the sensor stations 208 may be effectively reconfigured as desired while in the field.

Another function may be to update software stored in the sensor station 208. For instance, the processor 506 may interrogate a sensor station 208 to determine a revision level for one or more programmed instructions, algorithms or software. If needed, the processor 506 may upload the any available updates.

In another embodiment, the processor 506 may include a communication link 762 with a second processor 764 that has an associated operations database 766. The database 766 may be configured to store data relating to the location/position of the one or more seismic devices, the operating characteristic of the one or more seismic devices, and/or an operation history of the one or more seismic devices. The processor 764 and operations database 766 may be at the control module 500 or positioned at a remote location such as the CSC 490 (FIG. 2). Thus, personnel accessing the database 766 may be able to determine the availability, operating status, performance characteristics, operation history, etc. of the seismic devices deployed in the field.

Figure 10:
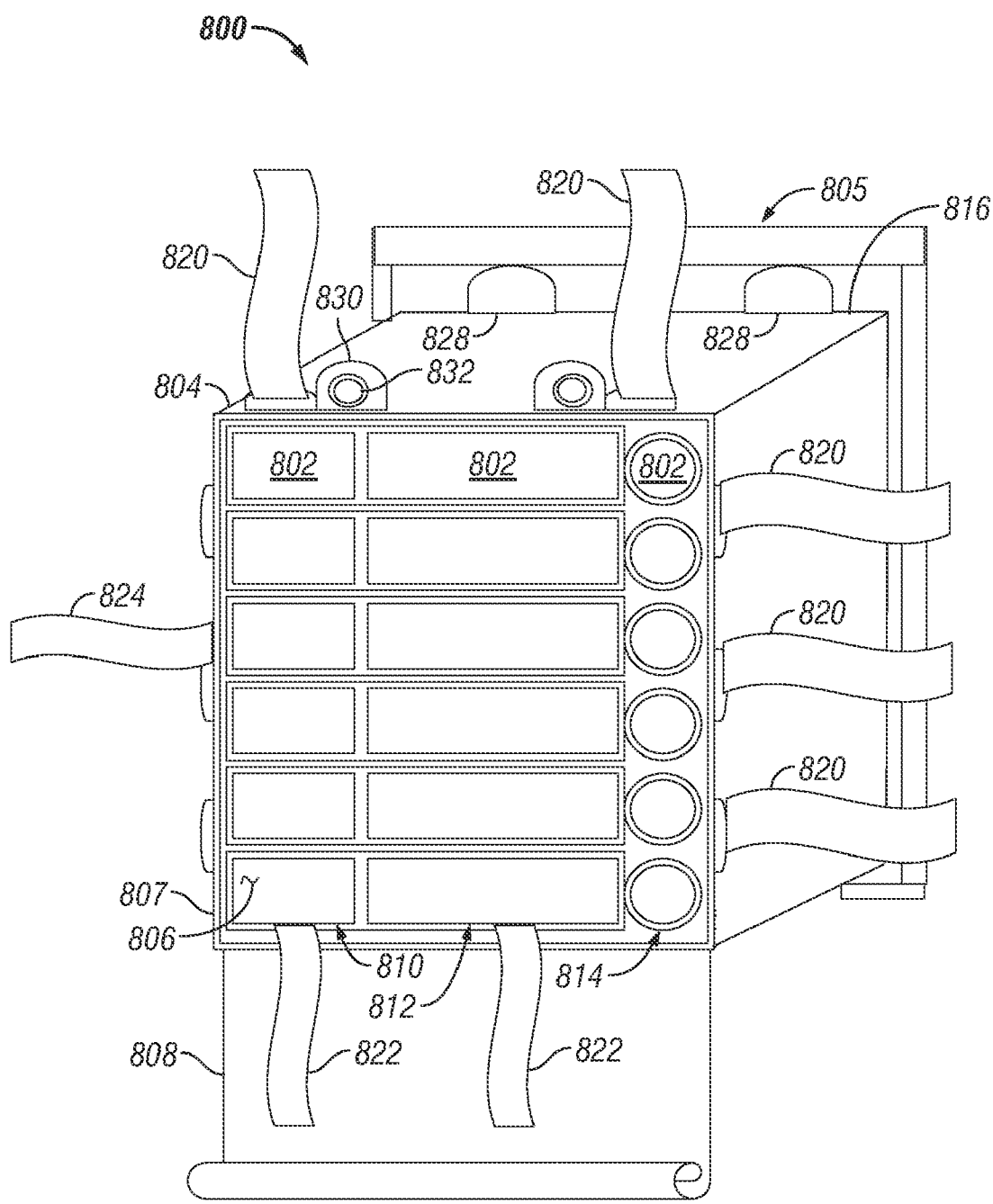
FIG. 10 illustrate one embodiment of a human wearable pack according to one embodiment of the present disclosure.

Referring back to FIGS. 5 and 6A, as previous described, two or more sensor stations 208 can be positioned inside containers 528 that are mounted to the interior surface 526 of the control module 500. Referring now to FIG. 10, in some embodiments, the container 528 may be formed as a human wearable pack 800 that provide an efficient means of not only storing the sensor stations 208 in the control module 500 but transporting the sensor stations 208 into and out of the field. This can be particularly advantageous with seismic systems made in accordance with the present disclosure because of the number of sensor stations utilized in the field.

In one embodiment, the pack 800 includes a plurality of internal compartments 802 for securely receiving the sensor station 208, which can include a sensor unit, a station unit and equipment such as an external battery. The pack 800 includes an exterior shell 804 formed of a rugged weatherproof material and the plurality of interior compartments 802 are arranged in a horizontal shelf fashion. The shell 804 can be attached to a user wearable frame 805. The frame 805 can be formed of lightweight tubular members and can be adjusted as needed to accommodate the user. The interior compartments 802 have openings 806 on a front face 807 of the pack 800 that is accessible upon removal of a panel 808 or flap. The openings 806 are oriented such that any cables connected to the devices residing within the compartments 802 can be accessed and connected to external plugs without removing the devices from the compartments 802. The pack 800 is susceptible to numerous variations, a few non-limiting examples of which are discussed below.

The length, width and depth of the individual compartments 802 can be selected to snugly receive the appropriate device. For example, a first set 810 of interior compartments 802 can be configured to receive individual station units, a second set 812 of interior compartments 802 can be configured to receive devices such as external batteries, and a third set 814 of compartments 802 for receiving shock-sensitive equipment such as sensors 308 (FIG. 3A). The third set 814 of compartments 802 can be formed in a tubular shape or any other suitable shape with foam padding that secure and protect the sensitive equipment during handling and transportation. The compartments 802 can be angled slightly to form a pocket such that when the pack 800 is positioned upright as shown, the devices tend to slide from the front face 807 toward the back 816 of the pack 800, which further securely positions the devices in the pack 800.

To keep the devices nested in their respective compartments 802, a plurality of straps 820 are positioned around the perimeter of the panel 806. For example, as shown, three straps 820 with buckles can be attached to the vertical sides of the pack 800 and two straps 820 can be attached to the horizontal side of the pack 800. Padding can be provided along the top, bottom and back 816 of the pack 800 to absorb any impacts and shocks associated with transportation and for the comfort of the wearer of the pack 800. During transportation, the panel 806 is folded over the front face 807 and the straps 820 are wrapped around the panel 808. Inside the pack 800, two straps 822 run vertically from top to bottom over the openings 806 of the first set 810 and second set 812 of compartments 802 to further secure the devices therein. A third horizontal strap 824 runs transverse to and secures the two vertical straps 822. The panel 808 can be a rigid or can be a flap flexible enough to be rolled partially or fully off the pack 800. On the back 816 of the pack 800, two padded shoulder straps 828 run vertically and are secured by a horizontal chest strap (not shown).

Advantageously, the pack 800 can also be configured to be manipulated or handled by mechanical devices found on transportation vehicles such as helicopters and in-field facilities such as the control module 500 (FIG. 5). In one arrangement, one or more strap elements 830 are fitted with reinforced ring members 832 for receiving a hook device or other extension member. Such elements can be utilized in a helicopter carousel or, potentially, a mechanical pack picker for helicopter pick-up. As described previously, the ring member 832, which can be steel loops, can allow the pack 800 to hang on hooks (not shown) on the surface 526 at an angle suitable for the devices in the pack 800 to be accessed during data downloading and battery charging in the control module 500.

It should be appreciated that the integrated nature of the pack 800 allows for all the equipment necessary for a survey to be collected, stored and carried in one easy to carry package. In an exemplary use, each pack 800 is provisioned with a complement of sensor stations, external batteries and sensors at a central warehousing facility. Next, the required quantity of packs 800 is transported via suitable means to the survey area. In some situations, the packs 800 are loaded onto and hooked or mounted into a suitable carousel within the bay of a helicopter. The helicopter drops the packs 800 off at a selected in-field location and are unloaded by ground crew. Each shell 802 may be then connected to a frame 805, if this has not been previously done. Because each pack 800 includes all the necessary complement of seismic equipment to position a sensor station, field personnel can immediately begin to navigate the survey area and place the sensor stations over the area of interest. After the survey is complete, the sensor stations are reloaded into the packs 800 and carried to a staging facility such as the control module 500. At the control module, the shells 802 are disconnected from their respective frames 805 and the shells 802 are hung from the surfaces 526 such that the compartments 802 are readily accessible upon removal of the cover 806. Because the cables for the seismic equipment in the pack 800 are accessible without unduly disturbing the seismic equipment, the data download and battery charging activity previously discussed can commence immediately. For example, the contents of the pack 800 need not be removed while undergoing any of the activities in the module 500.

From the above, it should be understood that the pack 800 increases mobility of in-field personnel and increases the accuracy of sensor station placement by providing all the necessary equipment needed for sensor station placement in a single human wearable package.

The term "seismic devices" or "seismic equipment" means any device that is used in a seismic spread, including, but not limited to, sensors, sensor stations, receivers, transmitters, power supplies, control units, seismic sources, etc.

While the particular disclosure as herein shown and disclosed in detail is fully capable of obtaining the objects and providing the advantages hereinbefore stated, it is to be understood that this disclosure is merely illustrative of the presently described embodiments of the disclosure and that no limitations are intended other than as described in the appended claims.

We claim:

1. A system for managing seismic data acquisition activity, comprising:
   (a) one or more seismic devices;
   (b) a module including a storage area configured to receive the one or more seismic devices, wherein the storage area is human habitable;
   (c) a processor associated with the module, the processor being configured to communicate with the one or more seismic devices; and
   (d) a database in communication with the processor, the database being configured to store data associated with the one or more seismic devices.

2. The system of claim 1 wherein the stored data is one of: (i) data received from the one or more seismic devices; (ii) data relating to a location of the one or more seismic devices, (iii) data relating to an operating characteristic of the one or more seismic devices, (iv) data relating to an operation history of the one or more seismic devices; and (v) data uniquely identifying a seismic device.

3. The system of claim 1 wherein the processor is configured to run diagnostics on the one or more seismic devices.

4. The system of claim 1 wherein the module includes a temperature controlled room configured to receive the processor.

5. The system of claim 1 wherein the module includes a plurality of modules.

6. The system of claim 1 wherein the processor is configured to transfer data from the database to the one or more seismic devices.

7. The system of claim 6 wherein the data includes one of: (i) a configuration file, (ii) an acquisition parameter, (iii) an operational parameter.

8. The system of claim 1 further comprising a plurality of containers, each container having a plurality of compartments, each compartment configured to receive at least one of the one or more seismic devices, wherein the plurality of containers are received inside the module.

9. The system of claim 8 further comprising an interface box on the module providing data transfer between the processor and the one or more seismic devices.

10. A system for managing seismic data acquisition activity, comprising:
    (a) a plurality of seismic devices configured to be deployed in a geological area of interest, the plurality of seismic devices including at least one cableless sensor station;
    (b) a module configured to receive at least one of the plurality of seismic devices into a storage area inside the module, the module being configured to be deployed in the geographical area of interest;
    (c) a processor associated with the module, the processor being configured to communicate with at least one of the plurality of seismic devices; and
    (d) a database in communication with the processor, the database being configured to store data associated with the plurality of seismic devices.

11. The system of claim 10 wherein the processor and database are configured to perform one of: (i) retrieve and store seismic data received from the plurality of seismic devices; (ii) track a location of each of the plurality of seismic devices, (iii) maintain a record of an operating characteristic of each of the plurality of seismic devices, (iv) maintain an operation history of each of the plurality of seismic devices, and (v) retrieve a unique identifying value from each of the plurality of seismic devices.

12. The system of claim 10, wherein the at least one cableless sensor station includes a station unit coupled to a sensor unit with a cable, and wherein each of the plurality of seismic devices includes an unique identifying value, and wherein the database stores data using the unique identifying value.

13. The system of claim 12, wherein the at least one cableless sensor station includes an antennae and further comprising a second processor in communication with the database, the second processor being configured to retrieve data from the database.

14. The system of claim 13 wherein the retrieved data relates to one of: (i) an operating status of at least one of the plurality of seismic devices, (ii) an availability of at least one of the plurality of seismic devices; and (iii) a location of at least one of the plurality of seismic devices.

15. A method for managing seismic data acquisition activity, comprising:
    (a) associating a unique identification value with each of a plurality of seismic devices configured to be deployed in a geological area of interest;
    (b) compiling data associated with the plurality of seismic devices in a database;
    (c) positioning a human habitable module proximate to the geographical area of interest, the module configured to receive at least one of the plurality of seismic devices into a storage area inside the module;
    (d) deploying the seismic devices in the geological area of interest; and
    (e) updating the database using the module and a processor configured to access the database.

16. The method of claim 15 further comprising retrieving seismic data from the plurality of seismic devices; and storing the seismic data in the database.

17. The method of claim 15, wherein each of the plurality of seismic devices includes a unique identifying value, and wherein the database stores data using the unique identifying value.

18. The method of claim 15 further comprising a second processor in communication with the database, the second processor being configured to retrieve data from the database.

19. The method of claim 15 wherein the compiled data relates to one of: (i) an operating status of at least one of the plurality of seismic devices, (ii) an availability of at least one of the plurality of seismic devices; and (iii) a location of at least one of the plurality of seismic devices.

20. The method of claim 15 wherein the compiled data includes a usage characteristic of at least one of the plurality of seismic devices.

21. The method of claim 20 wherein the usage characteristic is one of: (i) a location, (ii) an operating characteristic, and (iii) a service history.

22. A method for managing seismic data acquisition activity, comprising:

(a) positioning a module proximate to the geographical area of interest, the module configured to receive at least one of the plurality of seismic devices into a storage area formed inside the module, wherein the plurality of seismic devices includes a plurality of sensor stations;
(b) retrieving at least some of the plurality of sensor stations from the geological area of interest to form a group of sensor stations;
(c) disposing the group of sensor stations in a container;
(d) transporting the container from the geological area of interest to the module; and
disposing the container into the module.

23. The method of claim 22, wherein the group of sensor stations remains in the container while the processor communicates with each of the sensor stations.

24. The method of claim 22, further comprising forming a plurality of groups of sensor stations; disposing each of the groups in a separate container; and transporting each container from the geological area of interest.

25. The method of claim 22, further comprising transporting the container back into the geological area of interest with the same group of sensor stations.

* * * * *